US008678892B2

(12) United States Patent
Ok

(10) Patent No.: US 8,678,892 B2
(45) Date of Patent: Mar. 25, 2014

(54) VIRTUAL GOLF SIMULATION DEVICE AND METHOD FOR THE SAME

(75) Inventor: Jae Yoon Ok, Goyang-si (KR)

(73) Assignee: Golfzon Co., Ltd., Daejeon (KR)

( * ) Notice: Subject to any disclaimer, the term of this patent is extended or adjusted under 35 U.S.C. 154(b) by 15 days.

(21) Appl. No.: 13/148,232

(22) PCT Filed: Mar. 12, 2010

(86) PCT No.: PCT/KR2010/001558
§ 371 (c)(1),
(2), (4) Date: Aug. 5, 2011

(87) PCT Pub. No.: WO2010/104356
PCT Pub. Date: Sep. 16, 2010

(65) Prior Publication Data
US 2011/0301927 A1  Dec. 8, 2011

(30) Foreign Application Priority Data

Mar. 13, 2009  (KR) .................. 10-2009-0021820

(51) Int. Cl.
*A63F 9/24*  (2006.01)
(52) U.S. Cl.
USPC ............................................. 463/3
(58) Field of Classification Search
USPC ......... 434/252, 247; 463/14, 3; 473/150–156; 703/6; 704/258; 715/706
See application file for complete search history.

(56) References Cited

U.S. PATENT DOCUMENTS

| 5,507,485 A | * | 4/1996 | Fisher ........................... 473/407 |
| 5,728,006 A | * | 3/1998 | Teitell et al. ................... 473/151 |
| 6,152,856 A | * | 11/2000 | Studor et al. ....................... 482/8 |
| 6,396,041 B1 | * | 5/2002 | Vock et al. ................. 250/206.2 |
| 6,774,349 B2 | * | 8/2004 | Vock et al. ................. 250/206.1 |

(Continued)

FOREIGN PATENT DOCUMENTS

| JP | 08-155070 | 6/1996 |
| JP | 2004-230056 | 8/2004 |
| KR | 10-0815797 | 3/2008 |
| KR | 10-2009-0045640 | 5/2009 |

OTHER PUBLICATIONS

Voltanis, The computer game "Hot Shots Golf 3" as evidenced by the FAQ document by Voltanis, both © 2002, the FAQ document having an archive.org verified date of Jan. 16, 2008, downloaded by the USPTO from http://web.archive.org/web/20080116145315/http://faqs.ign.com/articles/374/374547p1.html on Aug. 24, 2012.*
Larsen, Lars Bo, et al., "Development of an automatic pool trainer" Proceedings of the 2005 ACM SIGCHI International Conference on Advances in computer entertainment technology, ACM, 2005.*
Marriott, Andrew et. al,"VHML—directing a talking head", in Active Media Technology, pp. 90-100, Springer Berlin Heidelberg, 2001.*
Lam, J. "Give Your App an Assistant With the Agent SDK." PC Magazine 17.18 (1998): 259-260.*
Korean Intellectual Property Office, International Search Report for International Application No. PCT/KR2010/001558, Oct. 28, 2010.
Korean Intellectual Property Office, Written Opinion of the International Searching Authority for International Application No. PCT/KR2010/001558, Oct. 28, 2010.

*Primary Examiner* — Pierre E Elisca
(74) *Attorney, Agent, or Firm* — Sherr & Jiang, PLLC

(57) ABSTRACT

A virtual golf simulation device and a method for the same are disclosed. The virtual golf simulation device includes a sensor for sensing flight of a ball hit by a golfer, an image processor for processing a simulated image of a virtual golf course and a simulated image of a flight trajectory of the ball sensed by the sensor, a caddy voice guide for providing a golfer logged in to a system with customized voice guidance through a virtual caddy selected for the golfer from among a plurality of virtual caddies, and a controller for identifying the logged-in golfer and controlling the caddy voice guide to provide the logged-in golfer with the customized voice guidance through the selected virtual caddy.

15 Claims, 8 Drawing Sheets

(56) References Cited

U.S. PATENT DOCUMENTS

| | | | |
|---|---|---|---|
| 6,947,044 B1* | 9/2005 | Kulas | 345/473 |
| 7,441,190 B2* | 10/2008 | Asami | 715/706 |
| 7,494,430 B2* | 2/2009 | Choi | 473/407 |
| 2002/0079433 A1* | 6/2002 | Vock et al. | 250/221 |
| 2003/0052914 A1* | 3/2003 | Asami | 345/745 |
| 2005/0227791 A1* | 10/2005 | McCreary et al. | 473/407 |
| 2008/0182685 A1* | 7/2008 | Marty et al. | 473/407 |
| 2008/0207331 A1* | 8/2008 | Beale | 463/42 |
| 2009/0191929 A1* | 7/2009 | Nicora | 463/3 |

* cited by examiner

VIRTUAL GOLF SIMULATION DEVICE AND METHOD FOR THE SAME

CROSS REFERENCE TO PRIOR APPLICATIONS

This application is a National Stage Patent Application of PCT International Patent Application No. PCT/KR2010/001558 (filed on Mar. 12, 2010) under 35 U.S.C. §371, which claims priority to Korean Patent Application No. 10-2009-0021820 (filed on Mar. 13, 2009), which are all hereby incorporated by reference in their entirety.

TECHNICAL FIELD

The present invention relates to a virtual golf simulation device and a method for the same, and more particularly, to a virtual golf simulation device and a method for the same, which display graphics and create voice when a golfer plays golf, hitting balls with golf clubs, such that the golfer feels a sense of reality as if he were playing golf on an actual golf course.

BACKGROUND ART

With recent upsurge in interest in playing golf, a virtual golf simulator called "Screen Golf" has gained popularity, which provides a realistic virtual golf simulation so that an indoor golfer feels as if he were enjoying golf on a real golf course.

To offer the same sense of reality that the golfer would feel in a real golf course, the virtual golf simulator simulates actual golf courses and the flight trajectories of balls hit by the golfer, as virtual reality.

DISCLOSURE OF INVENTION

Technical Problem

It is an object of the present invention to provide a virtual golf simulation device and a method for the same, which with the introduction of the concept of a caddy that gives advice in an actual play of golf to a virtual golf simulation environment, identifies an individual golfer logged in to a system, prompts the golfer to select a virtual caddy according to his tastes, and provides the golfer with voice guidance customized for the golfer by the selected virtual caddy, taking his personal characteristics and playing characteristics into full account, to thereby spur his interest in golf, increase golfer convenience, and boost the performance of the golfer.

Solution to Problem

In accordance with an aspect of the present invention, the above and other objects can be accomplished by the provision of a virtual golf simulation device including a sensor for sensing flight of a ball hit by a golfer, an image processor for processing a simulated image of a virtual golf course and a simulated image of a flight trajectory of the ball sensed by the sensor, a caddy voice guide for providing a golfer logged in to a system with customized voice guidance through a virtual caddy selected for the golfer from among a plurality of virtual caddies, and a controller for identifying the logged-in golfer and controlling the caddy voice guide to provide the logged-in golfer with the customized voice guidance through the selected virtual caddy.

In accordance with another aspect of the present invention, there is provided a virtual golf simulation method for sensing flight of a ball hit by a golfer and simulating the sensed flight of the ball, including logging in for virtual golf simulation by a golfer, extracting data about the golfer from a golfer data storing part and individually identifying the golfer based on the extracted data, selecting a virtual caddy for the golfer from among a plurality of virtual caddies, retrieving data about the selected virtual caddy from a caddy data storing part, and identifying a predefined situation or condition in which the golfer is placed during a game and providing the golfer with customized voice guidance through the selected virtual caddy according to the predefined situation or condition.

Advantageous Effects of Invention

As an individual golfer logged in to a system is identified, prompted to select a caddy according to his tastes, and provided with voice guidance customized for the golfer by the selected virtual caddy, with his personal characteristics and playing characteristics taken into full account, his interest in golf is spurred, golfer convenience is increased, and the performance of the golfer is boosted.

BRIEF DESCRIPTION OF DRAWINGS

The above and other objects, characteristics and other advantages of the present invention will be more clearly understood from the following detailed description taken in conjunction with the accompanying drawings, in which.

BEST MODE FOR CARRYING OUT THE INVENTION

The matters defined in the description such as a detailed construction and specific elements, are provided to assist in a comprehensive understanding of the embodiments of the invention. Accordingly, those of ordinary skill in the art will recognize that various changes and modifications of the embodiments described herein can be made without departing from the scope and spirit of the present invention.

A virtual golf simulation device and a method for the same according to exemplary embodiments of the present invention will be described below in detail.

The virtual golf simulation device according to the present invention basically includes a sensor for sensing the flight of a ball hit by a golfer and an image processor for processing a simulated image of the flight trajectory of the ball. Particularly, the virtual golf simulation device further includes a caddy voice guide for identifying a golfer logged in to a system and providing the golfer with customized voice guidance of a virtual caddy.

Figure 1:
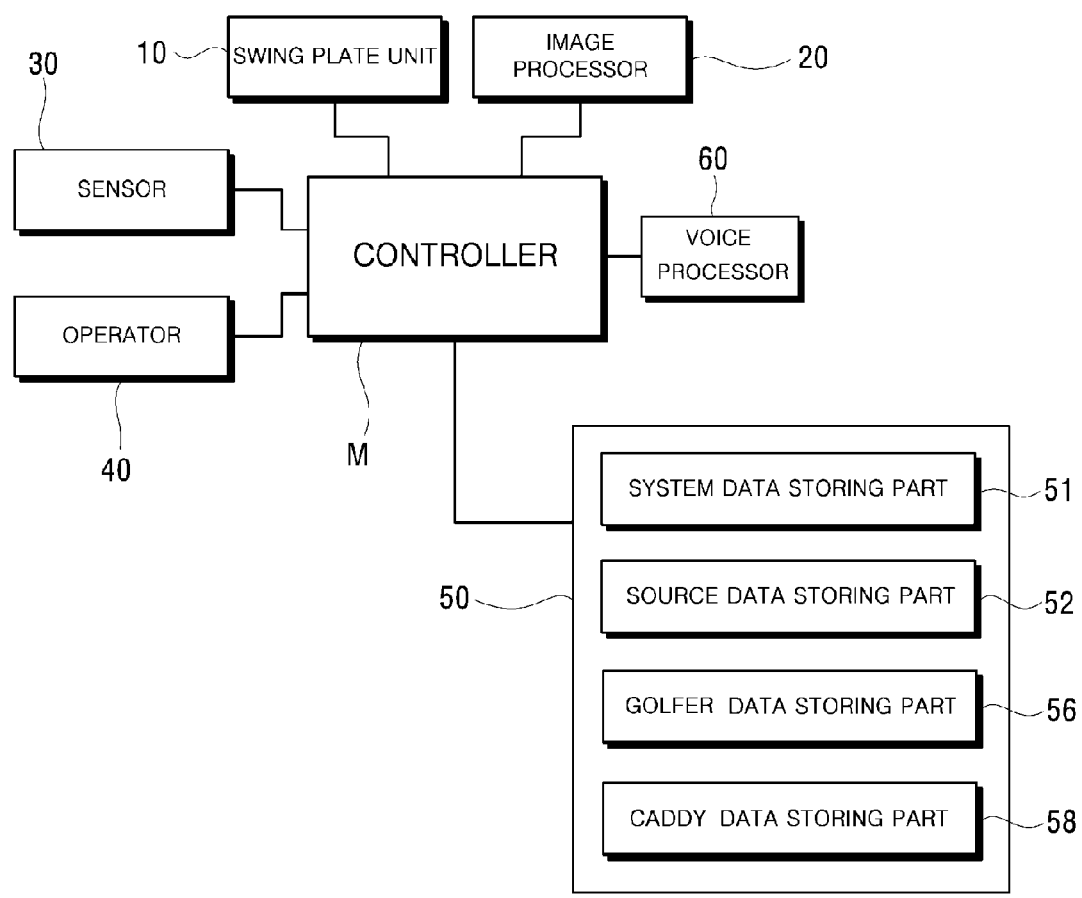
FIG. 1 is a schematic block diagram illustrating the configuration of a virtual golf simulation device according to an exemplary embodiment of the present invention.
Figure 2:
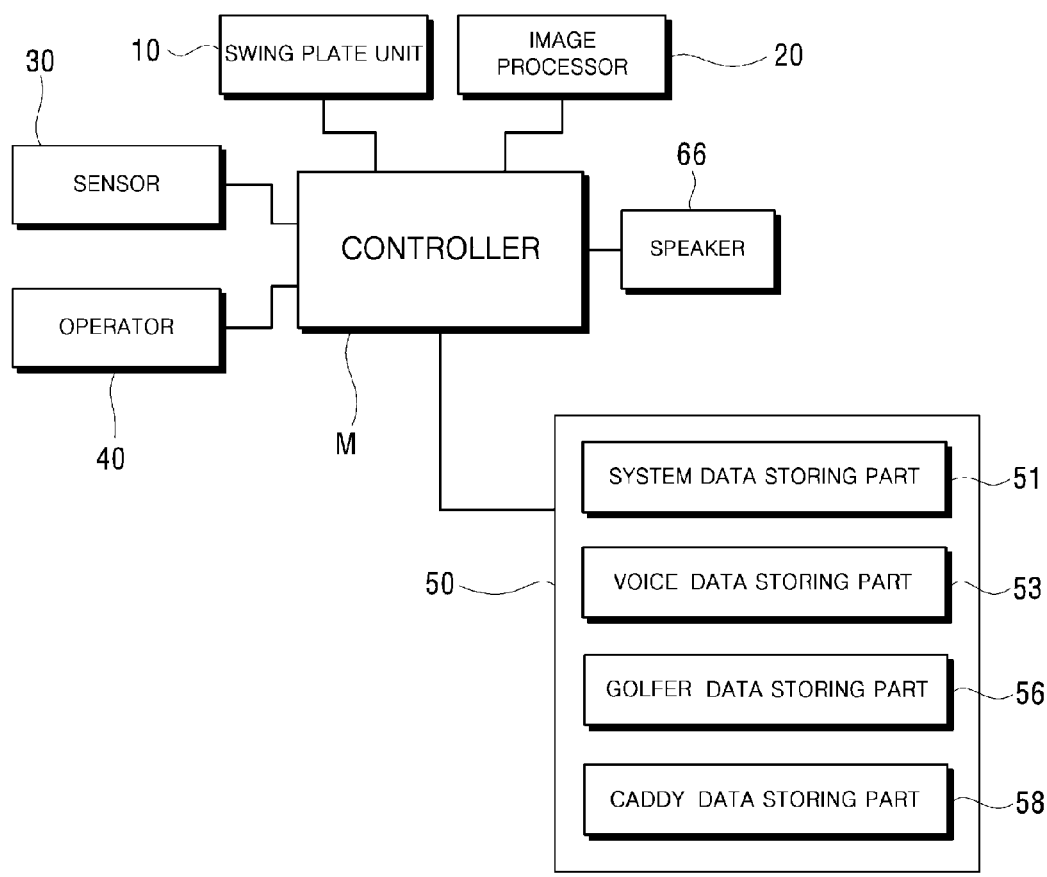
FIG. 2 is a schematic block diagram illustrating the configuration of a virtual golf simulation device according to another exemplary embodiment of the present invention.
Figure 3:
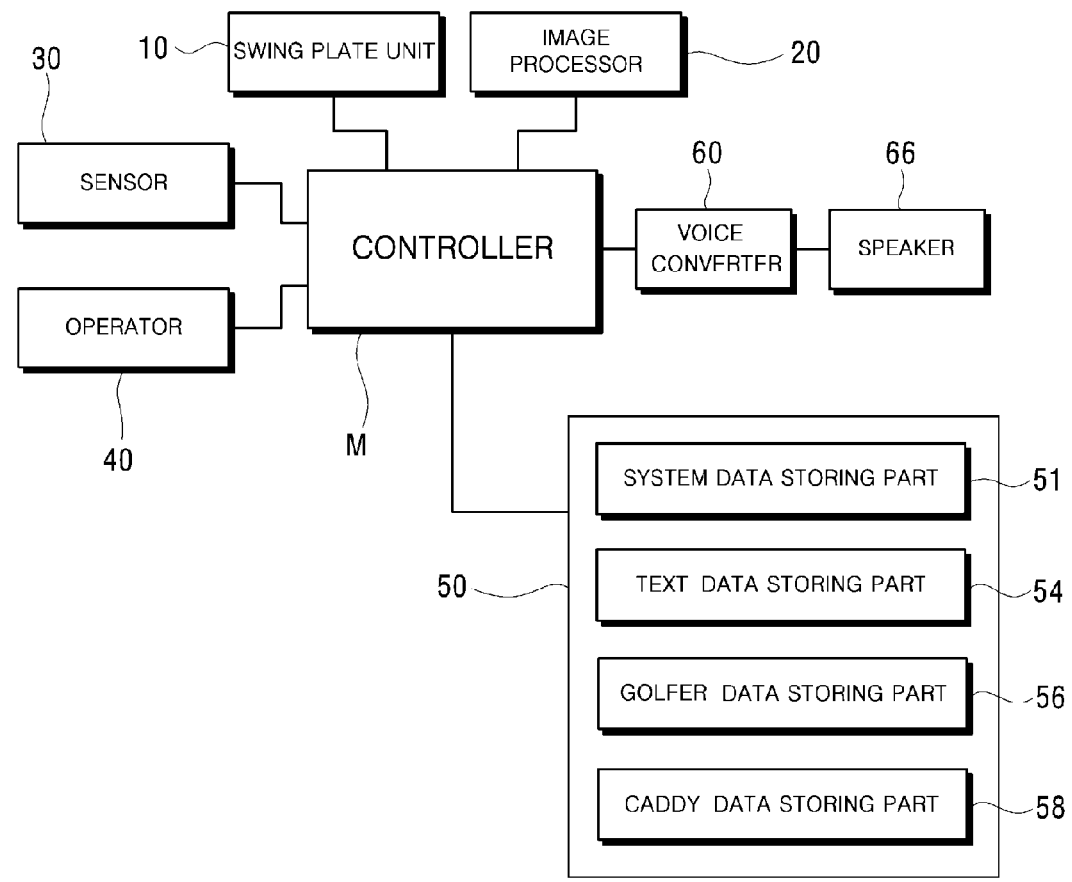
FIG. 3 is a schematic block diagram illustrating the configuration of a virtual golf simulation device according to another exemplary embodiment of the present invention.
Figure 4:
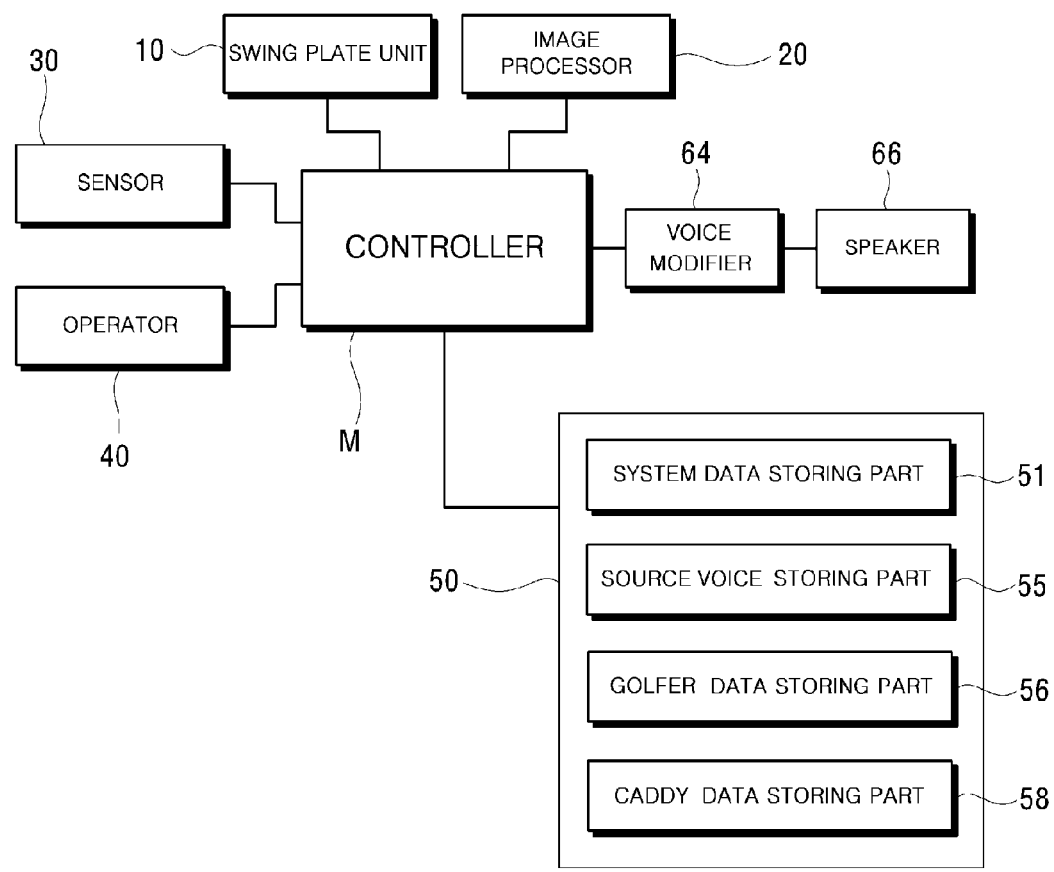
FIG. 4 is a schematic block diagram illustrating the configuration of a virtual golf simulation device according to a further exemplary embodiment of the present invention.

To be more specific, the caddy voice guide may include a DataBase (DB) 50 and a voice processor 60 as illustrated in FIG. 1. The DB 50 includes a source data storing part 52, a golfer data storing part 56, and a caddy data storing part 58. Referring to FIG. 2, the caddy voice guide may include the DB 50 and a speaker 66. The DB 50 has a voice data storing part 53, the golfer data storing part 56, and the caddy data storing part 58. As illustrated in FIG. 3, the caddy voice guide may include the DB 50, a voice converter 62, and the speaker 66. The DB 50 includes a text data storing part 54, the golfer data storing part 56, and the caddy data storing part 58. Also as illustrated in FIG. 4, the caddy voice guide may include the DB 50, a voice modifier 64, and the speaker 66. The DB 50 includes a source voice storing part 55, the golfer data storing part 56, and the caddy data storing part 58.

Regarding the present invention having the above characteristics, a description will be made of the schematic configuration of a virtual golf simulation device according to an exemplary embodiment of the present invention with reference to FIG. 1.

Referring to FIG. 1, the virtual golf simulation device according to the exemplary embodiment of the present invention includes a swing plate unit 10, an image processor 20, a sensor unit 30, an operator 40, a DB 50, and a controller M.

The swing plate unit 10 is prepared for a golfer to hit a ball with a golf club.

Preferably, the swing plate unit 10 is inclined at predetermined angles according to the topographical conditions of golf courses.

The image processor 20 projects a background image simulating a real golf course, a simulated image of the flight of the ball, and other data onto a screen (as used in a so-called screen golf, for example), so that the golfer views them on the screen.

The sensor unit 30 senses the velocity, direction, angle, etc. of the ball hit by the golfer and outputs the sensed velocity, direction, angle, etc. to the controller M. Preferably, the sensor unit 30 may include an aiming sensor for sensing an angle at which a golf club hits a ball and an impact point of the ball and a swing sensor for capturing an image of the swing of the golfer so that the captured swing image is analyzed.

The operator 40 is provided to allow the golfer to log in to the system or manipulate the virtual golf simulation device. With the operator 40, the golfer may control the flight direction of the ball and make other manipulations.

The DB 50 includes a system data storing part 51 for storing system data such as image data required for operation of the virtual golf simulation device and playing golf games.

The system data storing part 51 may be configured as an independent storage, or configured such that the system data are stored along with other data in a single storage.

The controller M extracts necessary system data from the system data storing part 51 according to a user manipulation of the operator 40 and operates the virtual golf simulation device based on the extracted system data. The controller M also extracts necessary image-related data from the system data storing part 51 and displays the extracted image-related data visually on a predetermined screen through the image processor 20.

In addition, the controller M simulates an image of the flight of a ball based on factors such as the velocity, direction, angle, etc. of the ball sensed by the sensor unit 30 and outputs the simulated image onto the screen through the image processor 20. When needed, the controller M operates the swing plate unit 10.

In the virtual golf simulation device illustrated in FIG. 1, the DB 50 further includes the source data storing part 52 for storing predetermined data for use in providing voice guidance to golfers, the golfer data storing part 56 for storing data about the golfers, and the caddy data storing part 58 for storing data about virtual caddies.

The source data storing part 52 stores data for use in voice guidance, specifically data being voice sources that are provided under predefined conditions of predefined situations (hereinafter, referred to "under predefined situations/conditions").

The source data may be stored as completed sentences suitable for the individual predefined situations/conditions. Alternatively or additionally, the source data may be stored as words such that certain words are combined into a sentence and output by voice under a predefined situation/condition.

The source data storing part 52 may be configured as an independent storage separate from other storing parts or as a physical part of a single storage, for storing source data.

The golfer data storing part 56 stores personal data, record data, and data about other playing characteristics of individual golfers.

If a golfer signs up as a member to use the virtual golf simulation device and has his data registered to the system, the registered data is stored in the golfer data storing part 56.

Preferably, as the golfer plays golf games, every data about the golfer such as data about his records in the golf games and data about his playing characteristics is stored in the golfer data storing part 56.

The golfer data storing part 56 may be configured as an independent storage for storing golfer data, or configured such that the golfer data are stored along with system data and source data in a single storage.

In other words, the golfer data storing part 56 may be a separate storage from other storing parts or as a physical part of a single storage, for storing golfer data.

The caddy data storing part 58 stores data about virtual caddies, specifically data about the personal characteristics and voice characteristics of the virtual caddies.

The data about virtual caddies stored in the caddy data storing part 58 may include data about real golfers such as Tiger Woods, K. J. Choi, Seri Pak, etc. or data about cartoon characters or real entertainers.

The caddy data storing part 58 may be configured as an independent storage for storing caddy data, or configured such that the caddy data are stored along with system data, golfer data, and source data in a single storage.

The virtual golf simulation device illustrated in FIG. 1 further includes the voice processor 60 for processing the source data stored in the source data storing part 52 to voice.

Preferably, if data stored in the source data storing part 52 is voice data, the voice processor 60 outputs the voice data as voice, and if data stored in the source data storing part 52 is text data, the voice processor 60 converts the text data to the voice of a particular caddy and outputs the voice.

When a golfer logs in to the system, the controller M identifies the golfer based on golfer data retrieved from the golfer data storing part 56. Also, the controller M identifies a caddy selected by the golfer or for the golfer based on caddy data retrieved from the caddy data storing part 58.

If the golfer is placed in a predefined situation/condition during playing golf, the controller M analyzes the personal characteristics, record characteristics, and playing characteristics of the golfer, of which the data are stored in the golfer data storing part 56, extracts source data for the caddy based on the analysis, and outputs the extracted source data to the voice processor 60, so that customized guidance is provided to the golfer by the voice of the caddy.

How the customized caddy voice guidance is provided to the golfer will be described later in detail.

Another exemplary embodiment of the virtual golf simulation device according to the present invention will be described below with reference to FIG. 2.

The exemplary embodiments illustrated in FIGS. 1 and 2 are basically identical in terms of the configurations and operations of the swing plate unit 10, the image processor 20, the sensor unit 30, the operator 40, the DB 50, and the controller M, whereas they differ in that the source data storing part 52 and the voice processor 60 illustrated in FIG. 1 are more specified in FIG. 2.

To avoid redundant description of the substantially same components between the virtual golf simulation devices illustrated in FIGS. 1 and 2, characteristics of the source data storing part and the voice processor more specified in FIG. 2 will be focused on in the following description.

In this exemplary embodiment, the voice data storing part 53 and the speaker 66 are adopted as the source data storing part and the voice processor, respectively, by way of example.

The voice data storing part 53 stores voice data for use in providing customized voice guidance of an individual caddy in a predefined situation/condition.

The voice data may be stored as completed sentences, classified by caddies and by situation/conditions, or words some of which are combined to a sentence and output by voice in a predefined situation/condition in which a golfer is placed.

The voice data storing part 53 may be configured as an independent storage for storing voice data, or configured such that the voice data are stored along with system data and golfer data in a single storage.

The speaker 66 amplifies the voice data stored in the voice data storing part 53 to voice audible to a golfer. In addition to the simple amplification of voice data, the speaker 66 may further carry out a predetermined audio process.

Accordingly, if the golfer is placed in a predefined situation/condition during playing golf, the controller M analyzes the personal characteristics, record characteristics, and play characteristics of the golfer, of which the data are stored in the golfer data storing part 56, extracts voice data for a caddy voice guidance, suitable for the predefined situation/condition, based on the analysis from the voice data storing part 53, and outputs the extracted voice data to the speaker 66, so that the caddy voice guidance provides the golfer with customized voice guidance.

How the customized caddy voice guidance is provided to the golfer will be described later in detail.

Another exemplary embodiment of the virtual golf simulation device according to the present invention will be described below with reference to FIG. 3.

The exemplary embodiments illustrated in FIGS. 1 and 3 are basically identical in terms of the configurations and operations of the swing plate unit 10, the image processor 20, the sensor unit 30, the operator 40, the DB 50, and the controller M, whereas they differ in that the source data storing part 52 and the voice processor 60 illustrated in FIG. 1 are more specified in FIG. 3.

To avoid redundant description of the substantially same components between the virtual golf simulation devices illustrated in FIGS. 1 and 3, characteristics of the source data storing part and the voice processor more specified in FIG. 3 will be focused on in the following description.

In this exemplary embodiment, the text data storing part 54 is adopted as the source data storing part, and the voice converter 62 and the speaker 66 are adopted as the voice processor, by way of example.

The text data storing part 54 stores text data for use in providing customized voice guidance of an individual caddy in a predefined situation/condition.

The text data may be stored as completed sentences, classified by caddies and by situation/conditions, or as words some of which are combined to a sentence and output by voice in a predefined situation/condition in which a golfer is placed.

The text data storing part 54 may be configured as an independent storage for storing text data, or configured such that the text data are stored along with system data and golfer data in a single storage.

The voice converter 62 converts particular text data stored in the text data storing part 55 to voice.

The speaker 66 amplifies the converted voice to be audible to a golfer.

If the golfer is placed in a predefined situation/condition during log-in to the system or during playing golf after the log-in, the controller M analyzes the personal characteristics, record characteristics, and playing characteristics of the golfer, of which the data are stored in the golfer data storing part 56, extracts text data for a caddy voice guidance based on the analysis from the text data storing part 54, outputs the extracted text data to the voice converter 62 so that the voice converter 62 converts the text data to the voice of the caddy, and outputs the voice of the caddy to the speaker 66. Thus customized guidance is provided to the golfer by the voice of the caddy.

It is possible to add particular voice features, that is, predetermined timbre, pitch and volume to voice during the text to voice conversion in the voice converter 62 in order to achieve the voice of the caddy selected for the golfer.

Alternatively, it is also possible to convert the text data to source voice data in the voice converter 62 and to process the source voice data to the voice of the caddy selected for the golfer by an operation such as an audio process and output the voice in the speaker 66.

How the customized caddy voice guidance is provided will be described later in detail.

A further exemplary embodiment of the virtual golf simulation device according to the present invention will be described below with reference to FIG. 4.

The exemplary embodiments illustrated in FIGS. 1 and 4 are basically identical in terms of the configurations and operations of the swing plate unit 10, the image processor 20, the sensor unit 30, the operator 40, the DB 50, and the controller M, whereas they differ in that the source data storing part 52 and the voice processor 60 illustrated in FIG. 1 are more specified in FIG. 4.

To avoid redundant description of the substantially same components between the virtual golf simulation devices illustrated in FIGS. 1 and 4, characteristics of the source data storing part and the voice processor more specified in FIG. 4 will be focused on in the following description.

In this exemplary embodiment, the source voice storing part 55 is adopted as the source data storing part, and a voice modifier 64 and the speaker 66 are adopted as the voice processor, by way of example.

The source voice storing part 55 stores voice data for use in providing customized voice guidance of an individual caddy in a predefined situation/condition.

The voice data may be stored as completed sentences, classified by caddies and by situation/conditions, or as words some of which are combined to a sentence and output by voice in a predefined situation/condition in which a golfer is placed.

The voice modifier 64 may process the voice data stored in the source voice storing part 55 so that the voice data takes predetermined voice characteristics, that is, a predetermined timbre, pitch, and volume. In this manner, each caddy may have his or her own voice characteristics.

To be more specific, particular voice data extracted from the source voice storing part 55 under a predefined situation/condition identified by the controller M is processed in terms of timbre, tone and volume to take the voice characteristics of a particular caddy and then output to the speaker 66.

The speaker 66 amplifies the voice data stored in the voice data storing part 53 to voice audible to a golfer.

If the golfer is placed in a predefined situation/condition during playing golf, the controller M analyzes the personal characteristics, record characteristics, and playing characteristics of the golfer, of which the data are stored in the golfer data storing part 56, extracts voice data for a caddy voice guidance, suitable for the predefined situation/condition, based on the analysis from the source voice storing part 55, processes the extracted voice data to the voice of the caddy selected for the golfer in the voice modifier 64, and outputs the voice of the caddy to the speaker 66, so that customized guidance is provided to the golfer by the voice of the caddy.

How the customized caddy voice guidance is provided will be described later in detail.

Predefined situations/conditions in which a golfer may be placed from log-in to the system through a game play to the end of the game play will be described below in detail.

[Table 1] and [Table 2] tabulate predefined situations that may be generated from log-in until the end of a game through the game, predefined conditions that may be set under each situation, and voice messages that a caddy may announce in each situation and condition.

TABLE 1

| situation | condition | voice announcement |
|---|---|---|
| Log-in | Within 7 days | Caddy A: <Nickname>, have a nice rounding! <br> Caddy B: <Nickname>, you scored <the number of points in the last game> last. I bet you will shave three strokes off the score! |
| | From 7 to 30 days | Caddy A: <Nickname>, I haven't seen you for <the number of days since the last log-in> days. Glad to see you again. <br> Caddy B: <Nickname>, I wish you a hole-in-one! |
| | After 30 days | Caddy A: <Nickname>, long time no see. I almost forgot your face. Please, come often. <br> Caddy B: <Nickname>, have a nice rounding. |
| Birdie | First of all games | Caddy A: Wow, congratulations on your first birdie! <br> Caddy B: <Nickname>, you scored your first birdie. Congratulations! |
| | First in the game | Caddy A: First birdie, today <br> Caddy B: <Nickname>, your first birdie today. Congratulations! |
| Hole-in-one | First of all games | Caddy A: Wow, congratulations on your first hole-in-one! <br> Caddy B: <Nickname>, you eventually made a hole-in-one. Congratulations! |
| Albatross | First of all games | Caddy A: Wow, congratulations on your first albatross! <br> Caddy B: <Nickname>, you hit your first albatross. Congratulations! |
| Eagle | First of all games | Caddy A: Wow, congratulations on your first eagle! <br> Caddy B: <Nickname>, you hit your first eagle. Congratulations! |

TABLE 2

| situation | condition | voice announcement |
|---|---|---|
| starting each hole | | Caddy A: This is a <remaining distance> m <the number of shots for par>—par hole. <br> Caddy B: <Nickname>, this hole is <about a bunker or rough>. |
| Tee shot | (customized advice)In case where the golfer has hit a ball out of bounds in past games | Caddy A: <Nickname>, be careful! Out of bounds often here. <br> Caddy B: <Nickname>, you were out of bounds last time. Be careful! |
| | (customized club recommendation)In case of recommending a golf club | Caddy A: <Nickname>, tee shot with wood driver 1, please. <br> Caddy B: <Nickname>, you were not good with wood drivers. I recommend iron 1. |
| Iron shot | (customized advice)In case where the distance to the green is within <preset range> | Caddy A: <Nickname>, you can land on the green in one shot. <br> Caddy B: <Nickname>, it is not easy to get on the green in one shot. Two shots would be better for safe landing on the green. |
| | (customized advice)In case of an upcoming obstacle like lake, etc. | Caddy A: <Nickname>, there is a big lake ahead. Try for the fairway over the lake. <br> Caddy B: <Nickname>, there is a big lake ahead. You're better try for the fairway in two or more shots. |
| | (customized advice)In case where the distance to the green is within <preset range> | Caddy A: <Nickname>, iron 1 would be better than iron 3. <br> Caddy B: <Nickname>, iron 5 would be better than iron 3. |

TABLE 2-continued

| situation | condition | voice announcement |
|---|---|---|
| | (customized advice)In case of upcoming obstacle like lake, etc. | Caddy A: <Nickname>, iron 1 would be better than iron 3.<br>Caddy B: <Nickname>, iron 5 would be better than iron 3. |
| putting | In case of 10 or more centimeters in height between the hole cup and the putting position | Caddy A: <Nickname>, it is a downhill. Please relax!<br>Caddy B: <Nickname>, it is an uphill. Hit strong, please! |

As noted from [Table 1] and [Table 2], a particular caddy may give a voice guide to a golfer under a specific situation, irrespective of conditions, or in a specific condition of a specific situation. If a plurality of conditions are defined for a specific situation, the plurality of conditions are prioritized and thus when the plurality of conditions are generated simultaneously, voice guidance may be provided according to their priority levels.

It may be contemplated that each caddy's voice message is stored for each situation/condition and a caddy selected by a golfer provides customized voice guidance to the golfer with the voice messages.

If a golfer is placed in a predefined situation/condition, it is preferable that the controller M analyzes at least one of data retrieved from the golfer data storing part, data about the golfer's strokes sensed by the sensor, data retrieved from the system data storing part that stores system data in relation to golf courses and rounding environments, data sensed about swings of the golfer, data sensed about the impact state of a ball, and data about an environment changed by a manipulation of the operator, analyzes the characteristics of a caddy selected for the golfer, and provides voice guidance to the golfer by the voice of the caddy according to the predefined situation/condition.

With reference to FIGS. 5 to 8, exemplary embodiments of a virtual golf simulation method according to the present invention will be described below.

Figure 5:
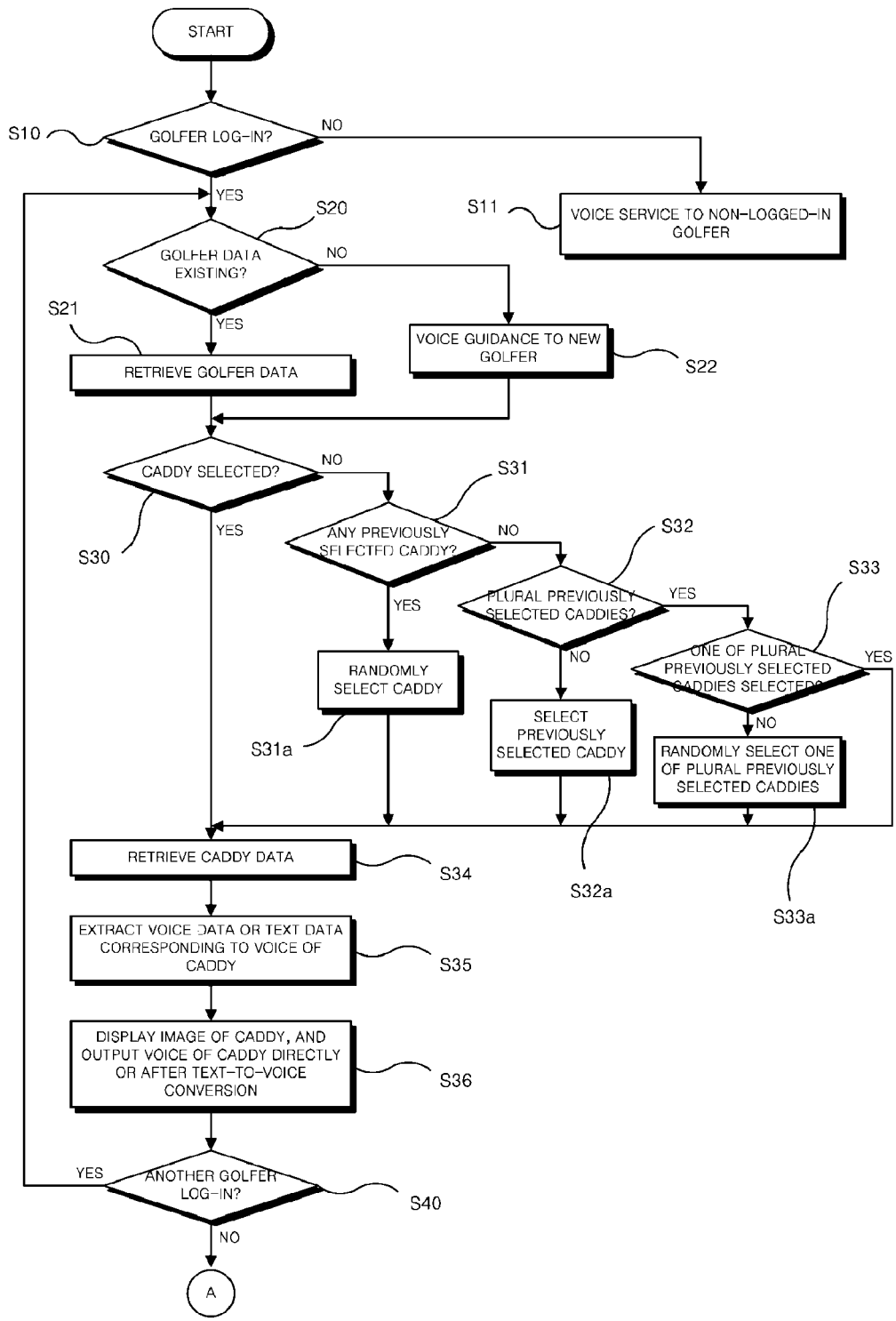
FIGS. 5 and 6 are flowcharts illustrating a virtual golf simulation method according to an exemplary embodiment of the present invention.
Figure 6:
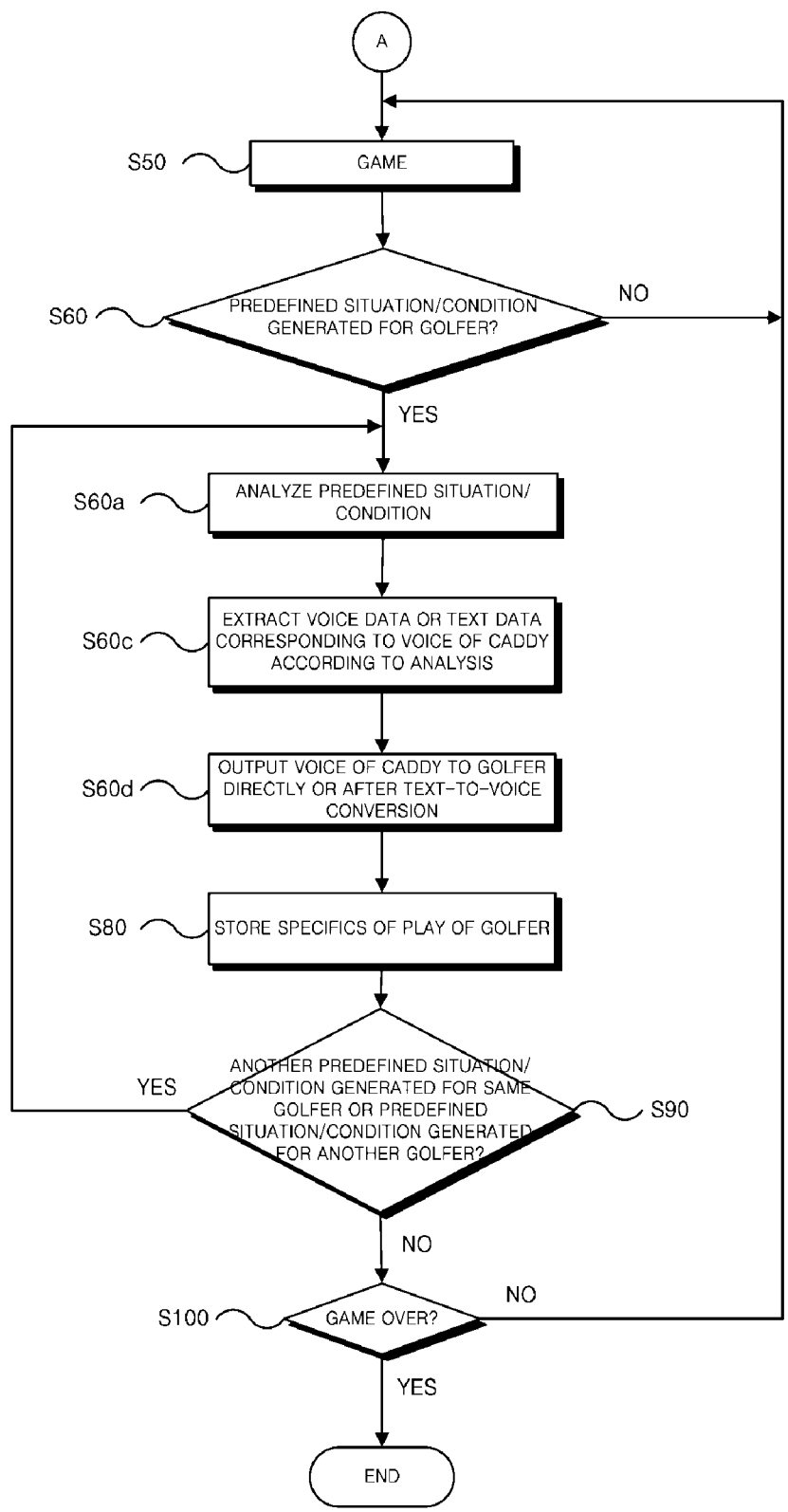

A description will first be made of a virtual golf simulation method according to an exemplary embodiment of the present invention with reference to FIGS. 5 and 6. In FIGS. 5 and 6, reference character A represents connection between the flowcharts illustrated in FIGS. 5 and 6.

Referring to FIG. 5, the controller determines whether a golfer has logged in to the system in step S10.

If the golfer has not logged in to the system, the controller preferably provides a predetermined voice message to the non-logged-in golfer in step S11.

If the golfer has logged in to the system, the controller determines whether there exists data about the logged-in golfer, referring to the data stored in the golfer data storing part, in step S20.

In the absence of any data about the logged-in golfer in the golfer data storing part or in case of the golfer's initial game after registration to the system, the controller preferably provides a preset voice guide to the new golfer in step S22.

On the other hand, in the presence of data about the logged-in golfer in the golfer data storing part, the data about the logged-in golfer is extracted from the golfer data storing part and output to the controller in step S21.

Thus the controller identifies the golfer based on the received golfer data.

Meanwhile, the controller determines whether the golfer has selected a virtual caddy in step S30. In relation to the caddy selection, preferably, the controller may process brief data about all caddies stored in the caddy data storing part through the image processor and display the processed caddy data on the screen, so that the golfer may select a caddy from among them.

Upon selection of a caddy by the golfer, data about the selected virtual caddy is retrieved from the caddy data storing part and the controller identifies the caddy based on the retrieved caddy data in step S34.

On the other hand, if the golfer has not selected a caddy, the controller determines whether there is any previously selected caddy for the golfer in step S31.

In the absence of any previously selected caddy for the golfer, the controller randomly selects one of the caddies of which the data are stored in the caddy data storing part in step S31a and data about the selected caddy is retrieved from the caddy data storing part in step S34.

In the presence of any previously selected caddy for the golfer, the controller determines whether there are a plurality of previously selected caddies for the golfer in step S32.

If there is only one previously selected caddy for the golfer, the previously selected caddy is selected for the golfer in step S32a and data about the selected caddy is retrieved from the caddy data storing part in step S34.

In the presence of a plurality of previously selected caddies, the controller determines whether the golfer has selected one of the previously selected caddies in step S33. More specifically, the controller preferably displays data about the previously selected caddies on the screen through the image processor and guides the golfer to select one of the displayed caddies.

Upon selection of one of the previously selected caddies, data about the selected caddy is retrieved from the caddy data storing part in step S34.

If the golfer selects none of the previously selected caddies, one of the previously selected caddies is randomly selected in step S33a and data about the selected caddy is retrieved from the caddy data storing part in step S34.

After identifying the golfer and the caddy selected for the golfer, the controller extracts voice data or text data from the source data storing part in step S35.

The extracted voice data is output through the speaker or the extracted text data is converted to voice in the voice converter and then output through the speaker in step S36.

For example, a golfer's log-in is predefined as a situation and three conditions are set for the predefined situation, that is, log-in within 7 days after the last log-in, log-in in 7 to 30 days after the last log-in, and log-in after 30 days after the last log-in. If a golfer satisfies one of the conditions, data corresponding to the condition is extracted from the source data storing part and output by the voice of a caddy selected for the golfer (refer to [Table 1]). In this manner, voice guidance is provided to the golfer by the caddy.

More specifically, predetermined data are extracted or combined for voice guidance and a voice guide is given to the golfer with the extracted or combined data, calling one of a name, a nickname, and an Identifier (ID) of the golfer included in the retrieved golfer data.

The controller determines whether another golfer has logged in to the system in step S40. In the presence of another logged-in golfer, step S21 and its subsequent steps, or step S22 and its subsequent steps are performed.

Upon completion of the golfer's log-in and caddy selection, the system is initialized for a golf game. After the initialization, the procedure of FIG. 6 is performed. That is, the golf game runs in step S50.

During the game, the controller monitors generation of a predefined situation/condition for the golfer in step S60.

If the golfer is placed in a predefined situation/condition, the controller analyzes the predefined situation/condition in step S60a.

Voice data of the caddy is extracted from the voice data storing part (refer to FIG. 2) or the source voice storing part (refer to FIG. 4) according to the result of the analysis, or text data of the caddy is extracted from the text data storing part (refer to FIG. 3) according to the result of the analysis, in step S60c.

The extracted voice data is output by the voice of the caddy (refer to FIG. 2) or after being processed to the voice of the caddy (refer to FIG. 4), or the extracted text data is converted to the voice of the caddy and output (refer to FIG. 3), in step S60d.

Steps S60a, S60c and S60d may be further specified depending on what is the predefined situation/condition in step S60. Specific examples of steps S60a, S60c and S60d will be described below with reference to FIGS. 7 and 8.

Steps S60a, S60c and S60d may precede or follow the golfer's play of golf, or both, as a caddy gives advice before or after a shot during playing a golf game in a real golf course.

After the above steps are completed, the controller stores specifics of the play of the golfer in the golfer data storing part in step S80.

The controller monitors generation of another predefined situation/condition for the golfer and generation of a predefined situation/condition for another golfer in step S90.

That is, the controller determines whether another predefined situation/condition has occurred to the golfer to which voice guidance is provided currently. If there is no further predefined situation/condition for the golfer, the controller determines whether a predefined situation/condition has occurred to another golfer.

Upon generation of another predefined situation/condition for the golfer, steps S60a, S60c and S60d are performed for the golfer. Upon generation of a predefined situation/condition for another golfer, steps S60a, S60c and S60d are performed for the golfer.

For example, on the assumption that three golfers are playing a golf game, one golfer may have another turn to swing after one swing according to a game rule. Preferably, the controller determines whether another predefined situation/condition has occurred to the same golfer, rather than it determines sequentially for each golfer whether a predefined situation/condition has occurred to the golfer. Hence, the controller monitors generation of a predefined situation/condition for every golfer, irrespective of the order of the golfers.

In step S100, if there is not any more predefined situation/condition generated for any golfer, the controller determines whether the game is over and continues or ends the game accordingly.

Figure 7:
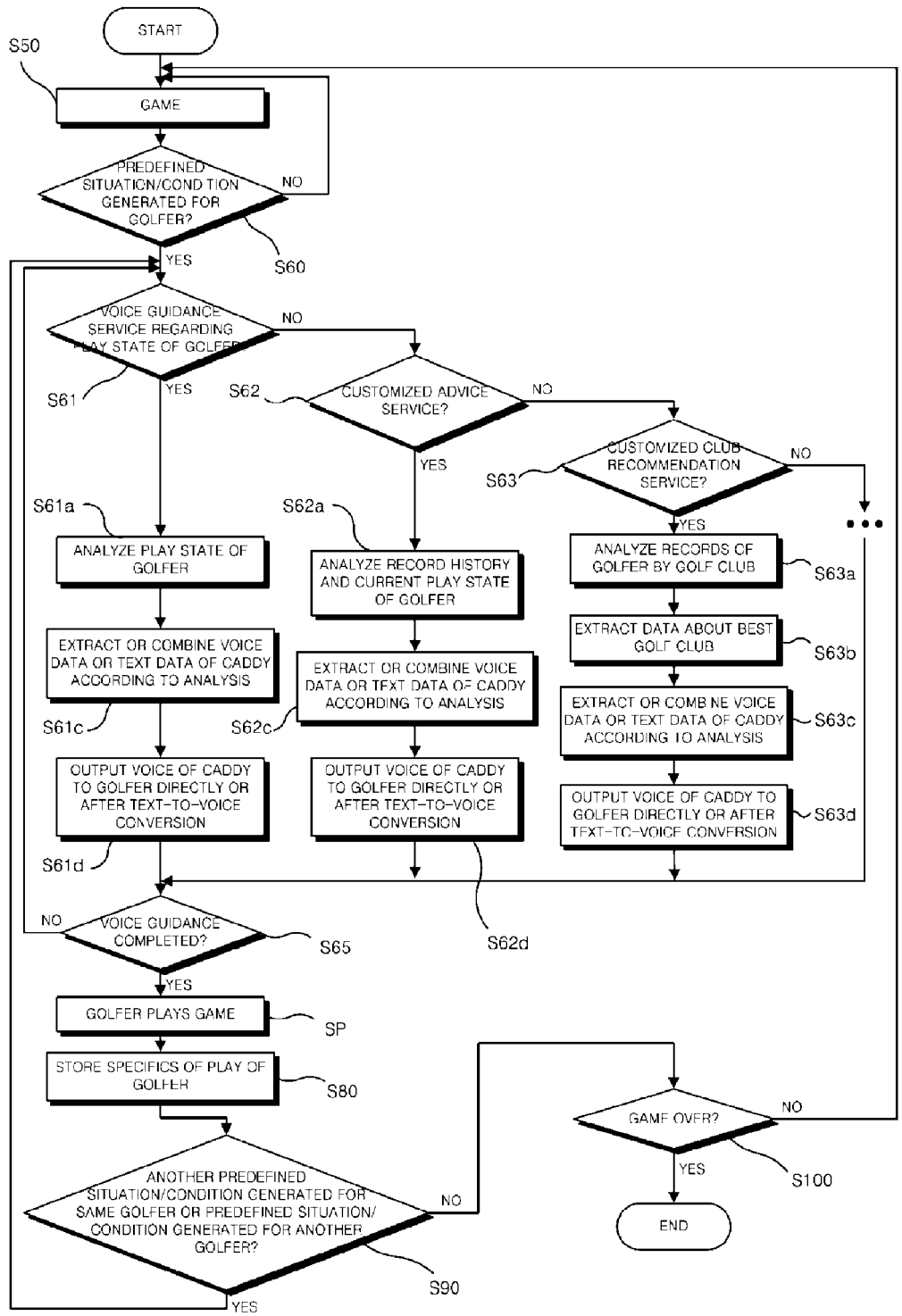
FIG. 7 is a detailed flowchart illustrating the virtual golf simulation method illustrated in FIG. 6 according to an exemplary embodiment of the present invention.

Several examples of the predefined situation/condition detected in step S60 and specified examples of steps S60a, S60c and S60d in the exemplary predefined situations/conditions are illustrated in FIG. 7. The procedure of FIG. 7 is carried out before the golfer's play.

Referring to FIG. 7, during the game in step S50, the controller monitors generation of a predefined situation/condition for the golfer in step S60.

A number of situations and conditions are predefined. These predefined situations/conditions may be categorized largely into situations/conditions to trigger a voice guidance service regarding the play state of the golfer (S61a, S61c and S61d), situations/conditions to trigger a voice guidance service to give customized advice to the golfer (S62a, S62c and S62d), and situations/conditions to trigger a voice guidance service to recommend a golf club suitable for the golfer (S63a, S63b, S63c and S63d).

Now a description will first be made of a case of servicing voice guidance with regard to the play state of the golfer.

The voice guidance concerning the play state of the golfer includes a voice guide about the characteristics of a hole which the golfer is playing on, a recommended swing, and playing characteristics of the golfer on the hole, identified from a play history of the golfer.

For example, a voice guide may be given to the golfer as to whether the golfer should hit a tee shot, an iron shot, a bunker shot, or a rough shot, or the golfer should putt (refer to [Table 1] and [Table 2]).

Also, it is possible to give precautions by the voice guidance, taking into account whether the golfer had a low score on the hole before.

That is, if the controller determines to service voice guidance as to the play state of the golfer in step S61, the controller extracts necessary data from the golfer data storing part and the system data storing part and analyzes the play state of the golfer in step S61a.

The controller identifies the voice characteristics of the caddy selected for the golfer from the caddy data storing part and extracts or combines voice data or text data of the caddy according to the predefined situation/condition in step S61c.

The extracted voice data of the caddy is output audibly, the extracted source voice data is processed to the voice of the caddy and then output audibly, or the extracted text data is converted to the voice of the caddy and then audibly output in step S61d.

Meanwhile, the voice guidance to give customized advice to the golfer involves giving advice to improve the performance of the golfer by voice.

For example, the swing of the golfer is diagnosed and advice is given based on the diagnosis. Or advice is given on aiming a golf ball based on an analysis of ball aiming of the golfer or on a route to take when a shot is to be hit, while notifying a bunker or rough ahead of the golfer (refer to [Table 1] or [Table 2]).

Specifically, if the controller determines to service voice guidance in order to give customized advice to the golfer in step S62, the controller extracts necessary data from the golfer data storing part and the system data storing part and analyzes the record history or current play of the golfer based on the extracted data in step S62a.

The controller identifies the voice characteristics of the caddy selected for the golfer from the caddy data storing part and extracts or combines voice data or text data of the caddy according to the predefined situation/condition in step S62c.

The extracted voice data of the caddy is output audibly, the extracted source voice data is processed to the voice of the caddy and then output audibly, or the extracted text data is converted to the voice of the caddy and then audibly output in step S62d.

Meanwhile, the voice guidance to give customized advice as to a golf club to the golfer involves selecting the most suitable golf club for the golfer and recommending the selected golf club to the golfer by voice in order to improve the performance of the golfer.

For example, if the golfer is currently placed in a situation to make an iron shot, the controller classifies the past records of the golfer by golf club by analyzing all record history of the golfer, selects the best golf club for the current play state of the golfer, and recommends the selected golf club to the golfer by voice guidance (refer to [Table 1] and [Table 2]).

If the controller determines that although it is typical to use iron club #5, taking into account a driving distance to go, iron club #3 leads to best results according to an analysis of the records of the golfer classified by types of golf clubs from the record history of the golfer, the controller recommends iron club #3 to the golfer by voice guidance.

Specifically, if the controller determines to service voice guidance in order to recommend a customized golf club to the golfer in step S63, the controller extracts necessary data from the golfer data storing part and the system data storing part and analyzes the records of the golfer classified by types of golf clubs based on the extracted data in step S63a.

Instead of analyzing all of the record history of the golfer, the records of a predetermined time period may be selectively analyzed.

In step S63b, the controller extracts data about the best golf club for the current play state of the golfer.

Then the controller identifies the voice characteristics of the caddy selected for the golfer from the caddy data storing part and extracts or combines voice data or text data of the caddy according to the predefined situation/condition in step S63c.

The extracted voice data of the caddy is output audibly, the extracted source voice data is processed to the voice of the caddy and then output audibly, or the extracted text data is converted to the voice of the caddy and then audibly output in step S63d.

After the above steps, the controller determines whether the caddy voice guidance has been completed for the predefined situation/condition in step S65. If determining that the caddy voice guidance has been completed, the procedure goes to the next step. On the other hand, if determining that the caddy voice guidance is still going on, steps S61a, S61c and S61d, steps S62a, S62c and S62d, or steps S63a, S63b, S63c and S63d are performed.

Upon completion of the voice guidance for the golfer, the golfer plays the game in step SP and specifics about the play are stored in the DB in step S80.

In step S90, the controller determines whether the golfer has been placed in another predefined situation/condition and whether another golfer has been placed in a predefined situation/condition.

If the golfer has been placed in another predefined situation/condition, one or more of the sets of steps S61a, S61c and S61d, steps S62a, S62c and S62d, and steps S63a, S63b, S63c and S63d are performed. If the golfer has not been placed in another predefined situation/condition and rather, another golfer has been placed in a predefined situation/condition, one or more of the sets of steps S61a, S61c and S61d, steps S62a, S62c and S62d, and steps S63a, S63b, S63c and S63d are performed for the another golfer.

If no further predefined situation/condition has been generated for any golfer, the controller determines whether the game has been over in step S100 and accordingly, continues or ends the game.

Steps S61a, S61c and S61d, steps S62a, S62c and S62d, and steps S63a, S63b, S63c and S63d are mere exemplary applications of situation/condition classifications, which should not be construed as limiting the present invention. Therefore, other steps may be carried out, apart from them.

Figure 8:
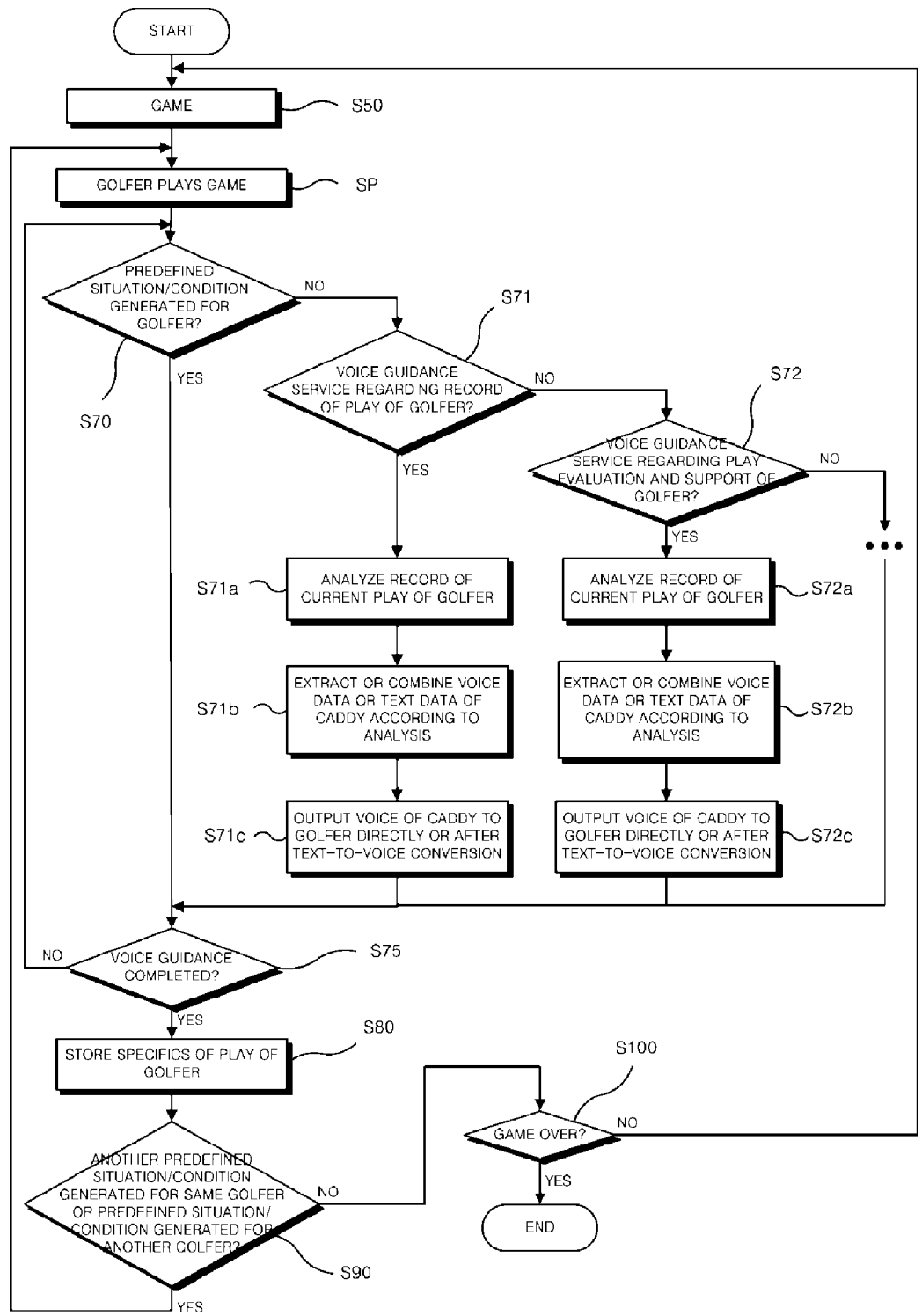
FIG. 8 is a detailed flowchart illustrating the virtual golf simulation method illustrated in FIG. 6 according to another exemplary embodiment of the present invention.

FIG. 8 illustrates an exemplary embodiment of steps performed under predefined situations/conditions that are generated after the golfer plays the game.

Referring to FIG. 8, as the game proceeds in step S50, the golfer plays the game in step SP. In step S70, the controller monitors generation of any predefined situation/condition for the golfer.

A number of situations and conditions are predefined. These predefined situations/conditions may be categorized largely into situations/conditions to trigger a voice guidance service regarding the record of the golfer in the play (S71), and situations/conditions to trigger a voice guidance service as to play evaluation and support of the golfer (S72).

The voice guidance service concerning the play record of the golfer is to announce records of a game that the golfer has played by voice.

For example, when the golfer scores the first birdie or eagle in entire golf games that he has played, or in the current game, the first birdie or eagle is announced by voice, or his final score is announced by voice (refer to [Table 1]).

That is, if the controller determines to service voice guidance as to records of the play of the golfer in step S71, the controller analyzes the record history of the golfer and the current play of the golfer based on data extracted from the golfer data storing part and the system data storing part in step S71a.

The controller identifies the voice characteristics of the caddy selected for the golfer from the caddy data storing part and extracts or combines voice data or text data of the caddy according to the predefined situation/condition in step S71b.

The extracted voice data of the caddy is output audibly, the extracted source voice data is processed to the voice of the caddy and then output audibly, or the extracted text data is converted to the voice of the caddy and then audibly output in step S71c.

Meanwhile, the voice guidance as to evaluation of the play of the golfer and support of the golfer involves announcing records of the current play of the golfer compared to his past records by voice, or giving a voice complement to the golfer when his play has been improved compared to his past plays, or giving a support voice message to the golfer when his current score is lower than a previous score.

For example, if the current record of the golfer is lower than a previous record, or if the current record of the golfer is lower than other golfers, a support message is output by voice to encourage the golfer.

Specifically, if the controller determines to service voice guidance in order to evaluate records of the play of the golfer or support the golfer in step S72, the controller analyzes the record history of the golfer and the current play specifics and records of the golfer based on data extracted from the golfer data storing part and the system data storing part in step S72a.

The controller identifies the voice characteristics of the caddy selected for the golfer from the caddy data storing part and extracts or combines voice data or text data of the caddy according to the predefined situation/condition in step S72b.

The extracted voice data of the caddy is output audibly, the extracted source voice data is processed to the voice of the caddy and then output audibly, or the extracted text data is converted to the voice of the caddy and then audibly output in step S72c.

After the above steps, the controller determines whether the caddy voice guidance has been completed for the predefined situation/condition in step S75. If determining that the caddy voice guidance has been completed, the procedure goes to the next step. On the other hand, if determining that the caddy voice guidance is still going on, steps S71a, S71b and S71c, or steps S72a, S72b and S72c are performed.

Upon completion of the voice guidance for the golfer, the specifics of the play are stored in the DB in step S80. In step S90, the controller determines whether the golfer has been placed in another predefined situation/condition and whether another golfer has been placed in a predefined situation/condition.

If the golfer has been placed in another predefined situation/condition, one or more of the sets of steps S71a, S71b and S71c and steps S72a, S72b and S72c are performed. If the golfer has not been placed in another predefined situation/condition and rather, another golfer has been placed in a predefined situation/condition, one or more of the sets of steps S71a, S71b and S71c and steps S72a, S72b and S72c are performed for the another golfer.

If no further predefined situation/condition has been generated for any golfer, the controller determines whether the game has been over in step S100 and accordingly, continues or ends the game.

Steps S71a, S71b and S71c and steps S72a, S72b and S72c are mere exemplary applications of situation/condition classifications, which should not be construed as limiting the present invention. Therefore, other steps may be carried out, aside from them.

Preferably, the virtual golf simulation device according to the exemplary of the present invention illustrated in FIG. 1 extracts or combines voice data stored in the source data storing part 52 and visually displays text corresponding to the extracted or combined voice data on the screen through the image processor 20, while outputting the extracted or combined voice data by voice, so that the golfer may view the text of the voice on the screen.

Specifically in the exemplary embodiments of the present invention illustrated in FIGS. 2 and 4, when voice guidance is provided using voice data stored in the voice data storing part 53 and the source voice storing part 55, text data corresponding to the voice is generated and visually output through the image processor 20. In the exemplary embodiment of the present invention illustrated in FIG. 3, when voice guidance is provided using text data stored in the text data storing part 54, the text data is visually output through the image processor 20. Thus the message of the voice guidance is viewed on the screen.

The above-described method for controlling a virtual golf simulation device services customized voice guidance to a golfer by a virtual caddy. Therefore, simulated golf games attract much interest from the golfer and improve the performance of the golfer.

Especially when the golfer receives a caddy service by the almost same voice of famous real golfers, the resulting sense of personalized service from the real golfers significantly increases the performance and interest of the golfer.

Mode for the Invention

Various embodiments have been described in the best mode for carrying out the invention.

INDUSTRIAL APPLICABILITY

A virtual golf simulation device and a method for the same according to the present invention are industrially applicable to, for example, a so-called screen golf system, so that a golfer can enjoy virtual golf games. Therefore, interest of the golfer is attracted toward golf and more convenience is provided to the golfer.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A virtual golf simulation device for a golfer to play golf on a virtual golf course realized by imaging processing, comprising:
a sensor for sensing flight of a ball hit by a golfer;
an image processor for processing a simulated image of a virtual golf course and a simulated image of a flight trajectory of the ball sensed by the sensor;
a data storing part including a golfer data storing part for storing data about individual golfers registered in a system, a caddy data storing part for storing data about a plurality of virtual caddies for guiding the golfer to play golf on the virtual golf course, and a source data storing part for storing data for use in providing customized voice guidance through each of the plurality of virtual caddies;
a caddy voice guiding part for providing a golfer logged in to the system with customized voice guidance for playing golf on the virtual golf course through a virtual caddy selected for the logged-in golfer from among the plurality of virtual caddies, wherein the caddy voice guiding part includes a voice processor for outputting i) data extracted from the source data storing part or ii) data which are extracted from the source data storing part and combined, wherein the voice processor outputs said i) or ii) as a voice of the selected virtual caddy via a speaker; and
a controller for identifying the logged-in golfer by extracting data about the logged-in golfer from the golfer data storing part, and for extracting data about the selected virtual caddy from the caddy data storing part and source data corresponding to the selected virtual caddy from the source data storing part for the customized voice guidance, wherein the controller controls the caddy voice guiding part to provide the logged-in golfer with the customized voice guidance using the extracted data through the selected virtual caddy while the logged-in golfer plays golf on the virtual golf course,
wherein the controller is configured to predefine a plurality of situations in which a virtual ball is placed on the virtual golf course and predefine a plurality of conditions per each predefined situation for the customized voice guidance by the selected virtual caddy,
wherein the customized voice guidance is predefined per each condition,
wherein the controller prioritizes the plurality of conditions, wherein the customized voice guidance is provided according to priority levels of the plurality of conditions when the plurality of conditions are generated simultaneously under a predefined situation.

2. The virtual golf simulation device according to claim 1, wherein the source data storing part includes a text data storing part for storing text data for use in providing customized voice guidance through each of the plurality of virtual caddies, and the voice processor includes a voice converter for converting iii) text data extracted from the text data storing part or iv) text data which are extracted from the text data storing part and combined, wherein the voice converter converts said iii) or iv) to the voice.

3. The virtual golf simulation device according to claim 1, wherein the source data storing part includes a text data storing part for storing text data for use in providing customized voice guidance through each of the plurality of virtual caddies, and the voice processor includes:
 a voice converter for converting v) text data extracted from the text data storing part or vi) text data which are extracted from the text data storing part and combined, wherein the voice converter converts said v) or vi) to the voice; and
 a voice modifier for selectively modifying the converted voice according to characteristics of each of the plurality of virtual caddies.

4. The virtual golf simulation device according to claim 1, wherein the source data storing part includes a source voice storing part for storing predetermined voice data, and the voice processor includes a voice modifier for selectively modifying vii) voice data extracted from the source voice storing part or viii) data which are extracted from the source voice storing part and combined, wherein the voice modifier selectively modifies said vii) or viii) according to characteristics of each of the plurality of virtual caddies.

5. The virtual golf simulation device according to claim 1, wherein the controller provides ix) the data extracted from the source data storing part or x) the data which area extracted from the source data storing part and combined, wherein the controller provides said ix) or x) visually along with the customized voice guidance.

6. The virtual golf simulation device of claim 1, wherein the plurality of conditions includes:
 a first condition regarding a distance from a current point on which the virtual ball is placed to a target point on the virtual golf course;
 a second condition regarding an obstacle between the current point and the target point;
 a third condition regarding a topography between the current point and the target point; and
 a fourth condition regarding a record of the logged-in golfer.

7. The virtual golf simulation device of claim 1, wherein the controller analyzes a play state of the logged-in golfer,
 wherein the customized voice guidance includes informing the logged-in golfer of a golf club customized for a current play state of the logged-in golfer according to the analysis by the controller.

8. A virtual golf simulation method for a golfer to play golf on a virtual golf course realized by imaging processing, comprising:
 a) identifying by a controller a logged-in golfer by extracting data about the logged-in golfer from a golfer data storing part;
 b) retrieving by the controller data about a virtual caddy selected for the logged-in golfer from among a plurality of virtual caddies stored in a caddy data storing part, wherein the selected virtual caddy provides the logged-in golfer with customized voice guidance for playing golf on the virtual golf course;
 c) sensing by a sensor flight of a ball hit by the logged-in golfer; and
 d) simulating and displaying a flight trajectory of the ball on the virtual golf course according to the sensing result;
 e) identifying by the controller a predefined situation in which a virtual ball of the logged-in golfer is placed on the virtual golf course, and simultaneously identifying a plurality of conditions predefined by the controller under the predefined situation for the customized voice guidance;
 f) selecting a condition among the plurality of the conditions simultaneously identified, according to priority levels of the plurality of conditions;
 g) extracting source data for the customized voice guidance corresponding to the selected virtual caddy from a source data storing part according to the selected condition, wherein the source data storing part includes data for use in providing the customized voice guidance through each of the plurality of virtual caddies;
 h) providing the logged-in golfer with the customized voice guidance for the selected condition by a processor which outputs i) data extracted from the source data storing part or ii) data which are extracted from the source data storing part and combined, wherein the processor outputs said i) or ii) as a voice of the selected virtual caddy via a speaker.

9. The virtual golf simulation method according to claim 8, wherein the customized voice guidance is provided by steps which comprises:
 extracting or combining predetermined data for voice guidance, using one of a name, nickname, and identifier of the logged-in golfer included in the data about the logged-in golfer, as a title; and
 providing the logged-in golfer with the customized voice guidance based on the title and the extracted or combined data by the voice of the selected virtual caddy.

10. The virtual golf simulation method according to claim 8, wherein the step e) comprises:
 determining a situation among a plurality of situations predefined by the controller, according to a play state based on a position of the virtual ball of the logged-in golfer placed on the virtual golf course;
 analyzing the play state of the logged-in golfer based on at least one of the data about the logged-in golfer, data about a golf course in which the logged-in golfer is playing the game, data about an environment of a current hole being played, and data about a progress state of the game; and
 identifying predefined conditions under the determined situation, based on the analyzed play state of the logged-in golfer.

11. The virtual golf simulation method according to claim 8, wherein the step e) comprises:
 determining a situation among a plurality of situations predefined by the controller, according to a record of the logged-in golfer, after the game is played;
 analyzing the record of the logged-in golfer based on the data about the logged-in golfer and data about a play of the logged-in golfer in the game; and
 identifying predefined conditions under the determined situation, based on the analyzed record of the logged-in golfer.

12. The virtual golf simulation method according to claim 8, wherein the step e) comprises:
- determining a situation among a plurality of situations predefined by the controller, according to a play state based on a position of the virtual ball of the logged-in golfer placed on the virtual golf course;
- analyzing the play of the logged-in golfer based on at least one of the data about the logged-in golfer, data about records of the logged-in golfer, data about a golf course in which the logged-in golfer is playing the game, data about an environment of a current hole being played, and data about a play state of the logged-in golfer; and
- identifying predefined conditions under the determined situation, according to the analyzed play of the logged-in golfer, wherein the predefined conditions have at least one condition to trigger customized advice regarding the play of the logged-in golfer,
- wherein the step f) includes selecting a condition to trigger the customized advice regarding the play of the logged-in golfer among the identified conditions,
- wherein the step g) includes extracting source data for the customized advice, based on the analyzed play of the logged-in golfer.

13. The virtual golf simulation method of claim 8, wherein the plurality of conditions includes:
- a first condition regarding a distance from a current point on which the virtual ball is placed to a target point on the virtual golf course;
- a second condition regarding an obstacle between the current point and the target point;
- a third condition regarding a topography between the current point and the target point; and
- a fourth condition regarding a record of the logged-in golfer, wherein the controller prioritizes the plurality of conditions.

14. The virtual golf simulation method of claim 8, wherein the controller analyzes a play state of the logged-in golfer, wherein the customized voice guidance includes informing the logged-in golfer of a golf club customized for a current play state of the logged-in golfer according to the analysis by the controller.

15. A virtual golf simulation method for a golfer to play golf on a virtual golf course realized by imaging processing, comprising:
- identifying by a controller a logged-in golfer by extracting data about the logged-in golfer from a golfer data storing part;
- retrieving by the controller data about a virtual caddy selected for the logged-in golfer from among a plurality of virtual caddies stored in a caddy data storing part, wherein the selected virtual caddy provides the logged-in golfer with customized voice guidance for playing golf on the virtual golf course;
- sensing by a sensor flight of a ball hit by the logged-in golfer; and
- simulating and displaying a flight trajectory of the ball on the virtual golf course according to the sensing result;
- identifying by the controller a predefined situation or a predefined condition under each predefined situation in which a virtual ball of the logged-in golfer is placed on the virtual golf course for selecting the customized voice guidance;
- determining whether the predefined situation or the predefined condition to trigger customized golf club recommendation has been generated;
- analyzing the logged-in golfer's records classified by types of golf clubs, or the records during a predetermined time period, based on the data about the logged-in golfer and data about records of the logged-in golfer, if the predefined situation or the predefined condition to trigger the customized golf club recommendation has been generated;
- extracting data about a golf club customized for a current play state of the logged-in golfer according to the analysis; and
- providing by a processor the logged-in golfer with the customized golf club recommendation which informs to the logged-in golfer of the golf club for playing at the predefined situation or condition identified by the controller, wherein the processor outputs the customized golf club recommendation as a voice of the selected virtual caddy via a speaker.

* * * * *